(12) United States Patent
Fan

(10) Patent No.: US 11,143,945 B2
(45) Date of Patent: Oct. 12, 2021

(54) LENS MODULE AND PROJECTION DEVICE

(71) Applicant: Coretronic Corporation, Hsin-Chu (TW)

(72) Inventor: Chen-Wei Fan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/995,833

(22) Filed: Aug. 18, 2020

(65) Prior Publication Data
US 2021/0063856 A1 Mar. 4, 2021

(30) Foreign Application Priority Data

Aug. 30, 2019 (CN) .......................... 201910811914.9

(51) Int. Cl.
*G03B 21/20* (2006.01)
*G02B 9/04* (2006.01)
*G02B 27/30* (2006.01)

(52) U.S. Cl.
CPC ............. *G03B 21/208* (2013.01); *G02B 9/04* (2013.01); *G03B 21/2033* (2013.01); *G02B 27/30* (2013.01)

(58) Field of Classification Search
CPC .... G03B 21/28; G03B 21/145; G03B 21/208; G03B 21/2013; G03B 21/2033; G03B 21/2053; H04N 9/315; H04N 9/3126; H04N 9/3141; H04N 9/3152; H04N 9/3155; H04N 9/3161; H04N 9/3164; G02B 9/02; G02B 9/04; G02B 9/12; G02B 9/60
See application file for complete search history.

(56) References Cited

U.S. PATENT DOCUMENTS

| | | | | |
|---|---|---|---|---|
| 2011/0228233 A1* | 9/2011 | Yagyu | ..................... | G03B 21/20 353/38 |
| 2013/0162800 A1* | 6/2013 | Kim | ...................... | G02B 21/14 348/79 |
| 2016/0011495 A1* | 1/2016 | Takagi | ................. | G03B 21/145 353/119 |
| 2016/0274446 A1* | 9/2016 | Tanaka | .................. | G03B 21/204 |
| 2018/0136549 A1* | 5/2018 | Tian | .................... | G02B 27/0955 |

FOREIGN PATENT DOCUMENTS

| | | |
|---|---|---|
| CN | 101855902 | 10/2010 |
| CN | 209590519 | 11/2019 |

* cited by examiner

*Primary Examiner* — Sultan Chowdhury
(74) *Attorney, Agent, or Firm* — JCIPRNET

(57) ABSTRACT

The invention provides a lens module. The lens module is disposed on a transmission path of a beam to expand the beam. The lens module includes a first lens assembly and a second lens assembly. The first lens assembly is disposed on the transmission path of the beam, and the first lens assembly has a first equivalent focal length. The second lens assembly is disposed on the transmission path of the beam from the first lens assembly, and the second lens assembly has a second equivalent focal length. The second equivalent focal length is greater than or equal to the first equivalent focal length. The invention also provides a projection device including the lens module. The lens module and the projection device of the invention can provide a projection image with uniform color distribution.

18 Claims, 5 Drawing Sheets

LENS MODULE AND PROJECTION DEVICE

CROSS-REFERENCE TO RELATED APPLICATION

This application claims the priority benefit of China application serial no. 201910811914.9, filed on Aug. 30, 2019. The entirety of the above-mentioned patent application is hereby incorporated by reference herein and made a part of this specification.

BACKGROUND

1. Technical Field

The invention relates to an optical module and an optical device, and more particularly relates to a lens module and a projection device using the lens module.

2. Description of Related Art

The imaging principle of a projection device is to convert an illumination beam generated by an illumination system into an image beam through a light valve, and then project the image beam onto a screen through a projection lens to form an image. In order to form the illumination beam, the illumination system may provide multiple beams of different wavelengths, which can enter a focusing lens along the same or different optical axes. After being converged, the illumination beam enters a light integration rod and is reflected several times in the light integration rod to achieve light uniformity. The illumination beam that has passed through the light integration rod may be directed to the light valve.

As the technology advances, the consumers expect projectors to not only provide better image quality but also be light, small, and portable. Therefore, how to miniaturize projectors has become an important issue. In a miniaturized projector, however, the illumination beam emitted by the light source may have a smaller illumination beam diameter. As a consequence, the illumination beam may have an excessively small incident angle when being focused on the light integration rod, which will cause the illumination beam to be insufficiently reflected in the light integration rod and result in non-uniform light mixing.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides a lens module that increases the range of the incident angle at which the beam enters the light integration rod so as to make the light mixing of the beam in the light integration rod more uniform.

The invention provides a projection device that provides a projection image with uniform color distribution.

Other objectives and advantages of the invention will be further understood from the technical features disclosed herein.

In order to achieve one or part or all of the above or other objectives, an embodiment of the invention provides a lens module. The lens module is disposed on a transmission path of a beam to expand the beam. The lens module includes a first lens assembly and a second lens assembly. The first lens assembly is disposed on the transmission path of the beam, and the first lens assembly has a first equivalent focal length. The second lens assembly is disposed on the transmission path of the beam from the first lens assembly, and the second lens assembly has a second equivalent focal length. The second equivalent focal length is greater than or equal to the first equivalent focal length.

In order to achieve one or part or all of the above or other objectives, an embodiment of the invention provides a projection device. The projection device includes an illumination system, a light valve, and a projection lens. The illumination system is configured to provide an illumination beam. The illumination system includes a light source module, the lens module described above, and a light uniformizing element. The light source module is configured to emit the illumination beam. The lens module is disposed on a transmission path of the illumination beam and is configured to expand the illumination beam. The light uniformizing element is disposed on the transmission path of the illumination beam from the lens module. The light valve is disposed on the transmission path of the illumination beam to modulate the illumination beam into an image beam. The projection lens is disposed on a transmission path of the image beam.

Based on the above, in the projection device of the embodiment of the invention, the light source module can expand the beam. Therefore, the beam that has passed through the lens module has a larger beam diameter, which increases the incident angle when the beam is focused to the light uniformizing element, and increases the number of times the beam is reflected in the light uniformizing element, thereby improving the uniformity of the light mixing. Thus, the projection device of the embodiment of the invention provides a projection image with uniform color distribution.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
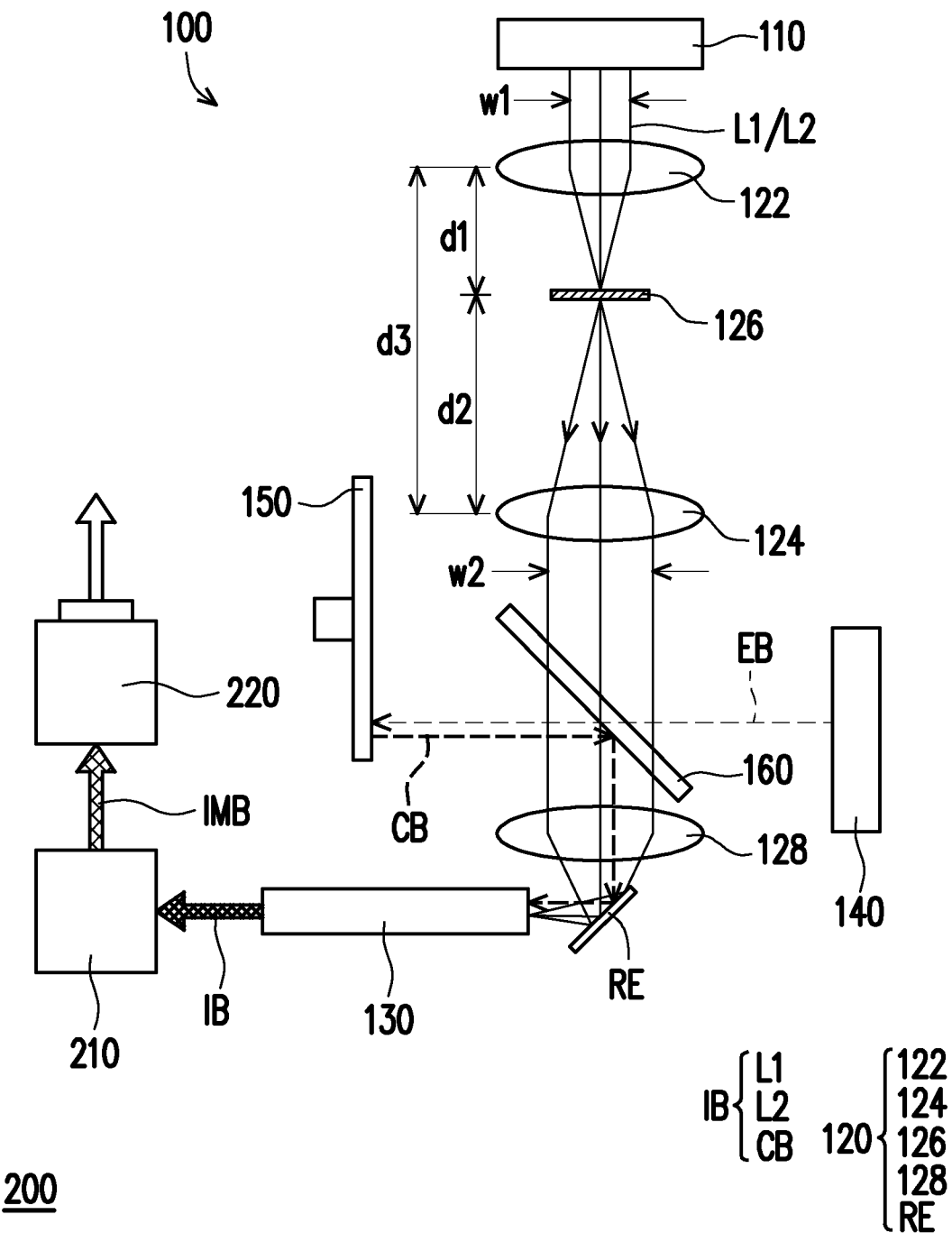
FIG. 1 is a schematic diagram of a projection device according to an embodiment of the invention.
Figure 2A:
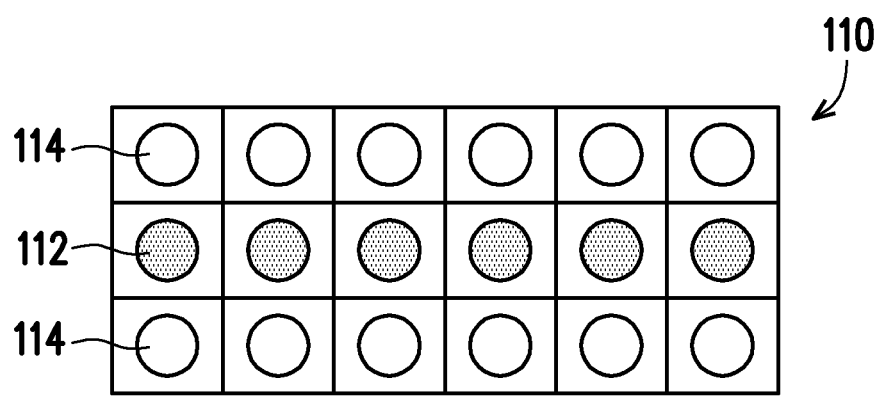
FIG. 2A is a schematic front view of a light source module of FIG. 1.
Figure 2B:
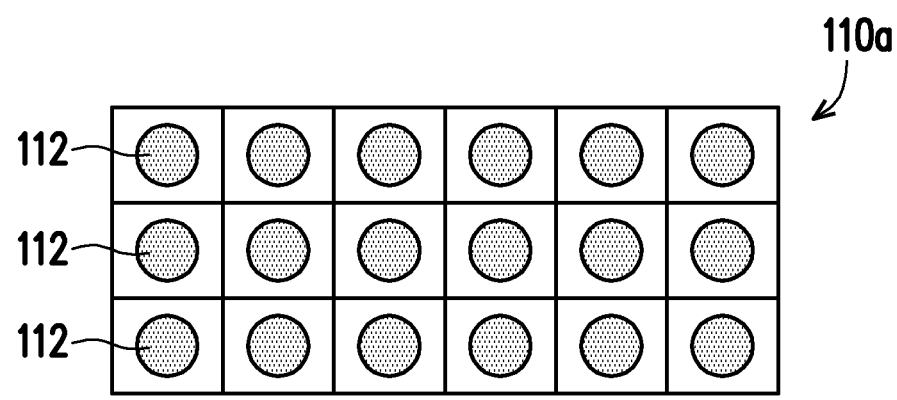
FIG. 2B is a schematic front view of another light source module of FIG. 1.

FIG. 1 is a schematic diagram of a projection device according to an embodiment of the invention. FIG. 2A is a schematic front view of a light source module of FIG. 1. FIG. 2B is a schematic front view of another light source module of FIG. 1. First, referring to FIG. 1, the projection device 200 of the present embodiment is configured to project an image beam onto a screen or a wall (not shown). The projection device 200 includes an illumination system 100, a light valve 210, and a projection lens 220. The illumination system 100 is configured to provide an illumination beam IB. The light valve 210 is disposed on the transmission path of the illumination beam IB to modulate the illumination beam IB into an image beam IMB. The projection lens 220 is disposed on the transmission path of the image beam IMB and configured to project the image beam IMB onto a screen or a wall (not shown) so as to form an image. After illumination beams IB of different colors, which are generated according to timings, reach the light valve 210, the light valve 210 converts the illumination beams IB of different colors into the image beam IMB according to timings and transmits the image beam IMB to the projection lens 220. Therefore, the image beam IMB converted by the light valve 210 can be projected out of the projection device 200 to form a colored image.

In the present embodiment, the light valve 210 is, for example, a digital micro-mirror device (DMD) or a liquid-crystal-on-silicon panel (LCOS panel). However, in other embodiments, the light valve 210 may be a transparent liquid crystal panel or other spatial optical modulators. Further, the present embodiment is not intended to limit the number of the light valves 210. In the present embodiment, the projection lens 220 is, for example, one or a combination of multiple optical lenses having diopter. The optical lenses include, for example, non-planar lenses such as biconcave lenses, lenticular lenses, concave-convex lenses, convex-concave lenses, plano-convex lenses, and plano-concave lenses, or various combinations thereof. The disclosure is not intended to limit the projection lens 220 to certain forms or types.

In the present embodiment, as shown in FIG. 1, the illumination system 100 includes a light source module 110, a lens module 120, and a light uniformizing element 130. The light source module 110 is configured to emit the illumination beam IB. The lens module 120 is disposed on the transmission path of the illumination beam IB and is configured to expand the illumination beam IB. The light uniformizing element 130 is disposed on the transmission path of the illumination beam IB from the lens module 120 and is configured to uniformize the illumination beam IB.

In some embodiments, the light source module 110 generally refers to a light source that emits a beam of a particular wavelength. For example, the light source module 110 may include an array or a group of laser diodes (LD), light emitting diodes (LED), or one of the foregoing. Nevertheless, the invention is not limited thereto.

In the embodiment shown in FIG. 2A, the light source module 110 includes at least one first light source 112 and at least one second light source 114. The at least one first light source 112 is configured to emit at least one first beam L1, and the at least one second light source 114 is configured to emit at least one second beam L2. Thus, the illumination beam IB of the embodiment of FIG. 2A may include at least one first beam L1 and at least one second beam L2. Moreover, in some embodiments, the main wavelength of the at least one first beam L1 may differ from the main wavelength of the at least one second beam L2 by 50 nm or more, for example, wherein the main wavelength is defined as the wavelength corresponding to the maximum light intensity. For example, the light source module 110 may be a red and blue laser diode bank. The first beam L1 is, for example, a blue laser beam, and the second beam L2 is, for example, a red laser beam. That is to say, the main wavelength of the first beam L1, for example, falls within the wavelength range of blue light, which is 465 nm, for example. The main wavelength of the second beam L2, for example, falls within the wavelength range of red light, which is 638 nm, for example. Nevertheless, the invention is not limited thereto.

FIG. 2A illustrates a plurality of first light sources 112 and a plurality of second light sources 114 as an example. The first light sources 112 and the second light sources 114 may be arranged symmetrically. For example, the second light source 114, the first light source 112, and the second light source 114 are arranged in this order from top to bottom. However, the first light sources 112 and the second light sources 114 may also be arranged asymmetrically. For example, the second light source 114, the first light source 112, the second light source 114, and the second light source 114 are arranged in this order from top to bottom. Nevertheless, the invention is not limited thereto.

In the embodiment shown in FIG. 2B, a light source module 110a is similar to the light source module 110 of FIG. 2A, but the light source module 110a includes only the first light source 112 and does not include the second light source 114. Therefore, the illumination beam IB of the embodiment of FIG. 2B includes the first beam L1 and does not include the second beam L2.

In the present embodiment, as shown in FIG. 1, the lens module 120 may include a first lens assembly 122 and a second lens assembly 124. The first lens assembly 122 is disposed on the transmission path of the first beam L1 and the second beam L2 of the illumination beam IB, and the first lens assembly 122 has a first equivalent focal length. The second lens assembly 124 is disposed on the transmission path of the first beam L1 and the second beam L2 of the illumination beam IB from the first lens assembly 122, and the second lens assembly 124 has a second equivalent focal length, wherein the second equivalent focal length is greater than or equal to the first equivalent focal length. In some embodiments, the lens module 120 may further include a diffusion element 126 disposed between the first lens assembly 122 and the second lens assembly 124. In such a configuration, the diffusion element 126 is disposed on the transmission path of the first beam L1 and the second beam L2 of the illumination beam IB from the first lens assembly 122. Therefore, the first beam L1 and the second beam L2 of the illumination beam IB from the light source module 110 sequentially pass through the first lens assembly 122, the diffusion element 126, and the second lens assembly 124. However, the invention is not limited thereto, and in other embodiments, the beams may pass through at least one or more of the first lens assembly 122, the diffusion element 126, and the second lens assembly 124 in other orders.

In the present embodiment, the illumination beam IB includes the first beam L1 and the second beam L2. However, the invention is not limited thereto, and in other embodiments, the illumination beam IB may further include a conversion beam CB (which will be described in detail below).

Specifically, the lens assembly of the present embodiment (for example, the first lens assembly 122 or the second lens assembly 124) may be a single lens or may include two or more lenses. For example, the lens assembly may be a convex lens, a combination of two or more convex lenses, or a combination of a convex lens and a concave lens. The lens assembly in the drawings of the invention is illustrated as a single lens as an example. Although the lens assembly (for example, the first lens assembly or the second lens assembly) of the present embodiment includes the term "assembly", it may be composed of one or two or more lenses. For example, the first lens assembly may include only one lens, two or more convex lenses, one convex lens and one concave lens, or one lens having a very large curvature. In some embodiments, the lens assembly (for example, the first lens assembly or the second lens assembly) may converge a collimated beam that passes through, or convert a diffused beam emitted from a focus into a collimated beam.

In addition, the diffusion element 126 of the present embodiment is, for example, a diffusion sheet or a light-transmissive substrate provided with diffusion particles or a diffusion structure.

In the present embodiment, the focus of the first lens assembly 122 is at the same position as the focus of the second lens assembly 124, and the diffusion element 126 is disposed at the focus of the first lens assembly 122 and the focus of the second lens assembly 124. In such a configuration, the distance d1 between the first lens assembly 122 and the diffusion element 126 is substantially equal to the first equivalent focal length of the first lens assembly 122, and the distance d2 between the diffusion element 126 and the second lens assembly 124 is substantially equal to the second equivalent focal length of the second lens assembly 124. Moreover, the distance d3 between the first lens assembly 122 and the second lens assembly 124 is substantially equal to the sum of the first equivalent focal length of the first lens assembly 122 and the second equivalent focal length of the second lens assembly 124. In other words, the illumination beam IB travels a first optical path length (equivalent to the distance d1) between the first lens assembly 122 and the diffusion element 126, and the first optical path length is substantially equal to the first equivalent focal length of the first lens assembly 122. The illumination beam IB travels a second optical path length (equivalent to the distance d2) between the diffusion element 126 and the second lens assembly 124, and the second optical path length is substantially equal to the second equivalent focal length of the second lens assembly 124. The illumination beam IB travels a third optical path length (equivalent to the distance d3) between the first lens assembly 122 and the second lens assembly 124, and the third optical path length is substantially equal to the sum of the first equivalent focal length of the first lens assembly 122 and the second equivalent focal length of the second lens assembly 124. In the present embodiment or other embodiments, the optical path length refers to the distance by which the beam travels in the optical axis direction, and the distance between two elements refers to the distance along the optical axis. The optical axis direction refers to the direction of the main optical axis of the beam.

For example, the first equivalent focal length and the second equivalent focal length may be 50 mm and 100 mm, 20 mm and 40 mm, or 15 mm and 30 mm, respectively. Nevertheless, the invention is not limited thereto.

In the present embodiment, the diffusion element 126 may be disposed at or near the focuses of the first lens assembly 122 and the second lens assembly 124. For example, the distance between the diffusion element 126 and the focus of the first lens assembly 122 (or the focus of the second lens assembly 124) may be less than or equal to 5 mm. Since the diffusion element 126 is disposed at or near the focus of the first lens assembly 122 or the second lens assembly 124, the first beam L1 and the second beam L2 are substantially concentrated on the optical axis when they pass through the diffusion element 126. In other embodiments, the diffusion element 126 may not be disposed at or near the focus of the first lens assembly 122 or the second lens assembly 124. In such a case, the beam is not concentrated on the optical axis when passing through the diffusion element 126. However, a beam that enters the diffusion element 126 in a direction different from the optical axis of the diffusion element 126 may also be expanded. In this configuration, the size of the spot of the beam in subsequent focusing may be changed (for example, enlargement of the spot). In a preferable embodiment, when the diffusion element 126 is disposed at or near the focus of the first lens assembly 122 or the second lens assembly 124, it causes the first beam L1 and the second beam L2 to be substantially concentrated on the optical axis when they pass through the diffusion element 126, so as to prevent the size of the spot from being changed unexpectedly (for example, enlargement of the spot).

In some embodiments, as shown in FIG. 1, the illumination beam IB (for example, the first beam L1 and the second beam L2) may be a collimated beam before passing through the first lens assembly 122, the diffusion element 126, and the second lens assembly 124, and have a first width w1. Next, the first lens assembly 122 is used to focus the illumination beam IB. Since the focus of the first lens assembly 122 and the focus of the second lens assembly 124 may be at substantially the same position, the second lens assembly 124 may be used to collimate the illumination beam IB that has been converged by the first lens assembly 122 so that the illumination beam IB becomes a collimated beam after passing through the first lens assembly 122, the diffusion element 126, and the second lens assembly 124 and has a second width w2. In addition, the second equivalent focal length of the second lens assembly 124 is greater than or equal to the first equivalent focal length of the first lens assembly 122, and the diffusion element 126 can expand the opening angles of the first beam L1 and the second beam L2 that pass through. Therefore, the second width w2 is greater than the first width w1, allowing the combination of the first lens assembly 122, the second lens assembly 124, and/or the diffusion element 126 to provide a beam expanding function.

In some embodiments, the lens module 120 further includes a third lens assembly 128 and a reflective element RE. The third lens assembly 128 is disposed on the transmission path of the illumination beam IB from the second lens assembly 124, and the third lens assembly 128 is configured to focus the illumination beam IB. The third equivalent focal length of the third lens assembly 128 is, for example, in a range of 20 mm to 40 mm. Nevertheless, the invention is not limited thereto, and the third equivalent focal length of the third lens assembly 128 may be greater than, equal to, or less than the first equivalent focal length of the first lens assembly 122 and/or the second equivalent focal length of the second lens assembly 124. In some embodiments, the third lens assembly may be used for convergence so as to match the size of the light receiving end of the following light uniformizing element. In some embodiments, the reflective element RE may be disposed on the transmission path of the illumination beam IB from the second lens assembly 124 and the third lens assembly 128, wherein the reflective element RE is configured to change the propagation direction of the illumination beam IB and transmit the illumination beam IB to the light uniformizing element 130.

In some embodiments, the illumination beam IB travels a fourth optical path length (equivalent to the distance between the third lens assembly 128 and the reflective element RE plus the distance between the reflective element RE and the light uniformizing element 130) between the third lens assembly 128 and the light uniformizing element 130, and the fourth optical path length is substantially equal to the third equivalent focal length of the third lens assembly 128.

In some embodiments, the reflective element RE is disposed on the optical path between the third lens assembly 128 and the light uniformizing element 130. However, in some embodiments, the reflective element RE may be disposed on the optical path between the second lens assembly 124 and the third lens assembly 128. Alternatively, in some other embodiments, the lens module 120 may not include the reflective element RE, and the third lens assembly 128 may directly focus the illumination beam IB to the light receiving end of the light uniformizing element 130 (in such a case, the light uniformizing element 130 is rotated by 90 degrees accordingly).

Figure 5A:
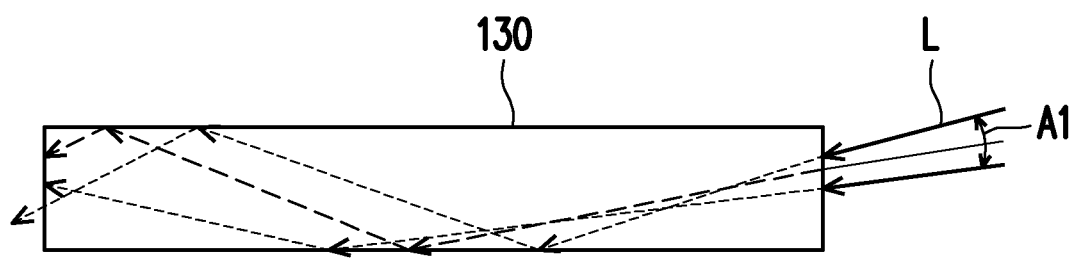
FIG. 5A and FIG. 5B illustrate the optical paths when a beam enters a light uniformizing element at different incident angles.
Figure 5B:
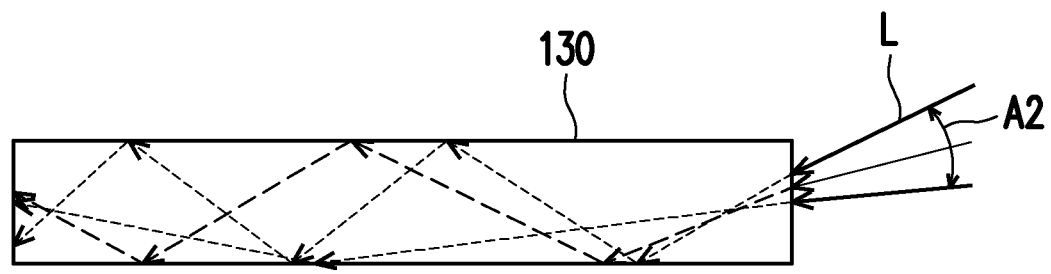

For illustrative purposes, in the present embodiment, FIG. 5A and FIG. 5B illustrate the optical paths when a beam enters the light uniformizing element at different incident angles. In the present embodiment, the light uniformizing element 130 is, for example, an integration rod. As shown in FIG. 5A, when the beam L enters the light uniformizing element 130 at a smaller incident angle A1, the beam L is reflected fewer times in the light uniformizing element 130, and thus the uniformity of the light mixing of the beam L is poor. As shown in FIG. 5B, when the beam L enters the light uniformizing element 130 at a larger incident angle A2, the beam L is reflected more times in the light uniformizing element 130, and thus the uniformity of the light mixing of the beam L is better.

It is known from the above that, with the configuration described above, the lens module 120 of the embodiment of the invention can be used to expand the illumination beam IB. Therefore, the illumination beam IB that has passed through the first lens assembly 122, the diffusion element 126, and the second lens assembly 124 of the lens module 120 has a larger beam diameter (that is, the width w2), which increases the incident angle of the illumination beam IB when it is focused to the light uniformizing element 130, and increases the number of times the illumination beam IB is reflected in the light uniformizing element 130, thereby improving the uniformity of the light mixing. Thus, the projection device 200 of the embodiment of the invention provides a projection image with uniform color distribution.

It should be noted that, in other embodiments, the lens module 120 may not include the diffusion element 126. In such a case, the second equivalent focal length of the second lens assembly 124 is greater than the first equivalent focal length of the first lens assembly 122, so that the combination of the first lens assembly 122 and the second lens assembly 124 also provides a beam expanding function.

In some embodiments, referring to FIG. 1 again, the illumination system may further include an excitation light source 140 and a wavelength conversion element 150. The excitation light source 140 is configured to emit an excitation beam EB. The wavelength conversion element 150 is disposed on the transmission path of the excitation beam EB, and the wavelength conversion element 150 is configured to convert the excitation beam EB into a conversion beam CB. In the present embodiment, the excitation light source 140 may be similar to the light source module 110. For example, the excitation light source 140 may be a blue laser diode bank. Then, the excitation beam EB is a blue laser beam having a main wavelength that, for example, falls within the wavelength range of blue light. The main wavelength of the excitation beam EB may be different from the main wavelength of the first beam L1 or the second beam L2. For example, the main wavelength of the excitation beam EB may be 455 nm. However, in other embodiments, the main wavelength of the excitation beam EB may be the same as the main wavelength of the first beam L1 or the second beam L2.

In some embodiments, the wavelength conversion element 150 is, for example, a phosphor wheel. The wavelength conversion element 150 may include a wavelength conversion region (not shown), and the wavelength conversion region may be provided with a wavelength conversion material. The wavelength conversion material may convert a short wavelength beam that is transmitted to the wavelength conversion region into a long wavelength beam. For example, the wavelength conversion material is, for example, a yellow phosphor that converts the excitation beam EB into a yellow beam. When the excitation beam EB is emitted to the wavelength conversion region, the wavelength conversion material may be excited to emit the conversion beam CB which is a yellow beam, for example. However, in different embodiments, the number or configuration of the wavelength conversion regions of the wavelength conversion element 150 may be changed depending on the type of the illumination system 100. The disclosure is not intended to limit the wavelength conversion element 150 to certain configuration forms or types.

In some embodiments, the illumination system may further include a light combining element 160. The light combining element 160 is disposed on the transmission path of the first beam L1, the second beam L2, the excitation beam EB, and the conversion beam CB. The first beam L1 and the second beam L2 enter the light combining element 160 in a first direction (for example, the vertical direction of FIG. 1), and the excitation beam EB and the conversion beam CB enter the light combining element 160 in a second direction (for example, the left-right direction of FIG. 1), wherein the first direction is perpendicular to the second direction. Nevertheless, the invention is not limited thereto.

Specifically, the light combining element 160 may be a dichroic unit such as a dichroic mirror (DM) or a dichroic prism to provide different optical effects on beams of different colors. For example, the light combining element 160 may allow blue and red beams to pass and reflect yellow and green beams. In the present embodiment, the light combining element 160 may be designed to allow the first beam L1, the second beam L2, and the excitation beam EB to pass, and reflect the conversion beam CB. Therefore, the light combining element 160 transmits the excitation beam EB from the excitation light source 140 to the wavelength conversion element 150, and combines the conversion beam CB from the wavelength conversion element 150 with the first beam L1 and the second beam L2 from the light source module 110 and then transmits it to the light uniformizing element 130.

To sum up, the illumination beam IB of the present embodiment may include the first beam L1, the second beam L2, the conversion beam CB, and/or the excitation beam EB, wherein the light source module 110 provides the first beam L1 and the second beam L2, and the excitation light source 140 provides the excitation beam EB to excite and generate the conversion beam CB. At last, the illumination beam IB is modulated by the light valve 210 into the image beam IMB, and the image beam IMB is projected out of the projection device 200 by the projection lens 220.

In the following embodiments, some of the technical contents that are the same as or similar to those of the above embodiments are omitted. Please refer to the descriptions of the above embodiments for the omitted contents.

Figure 3:
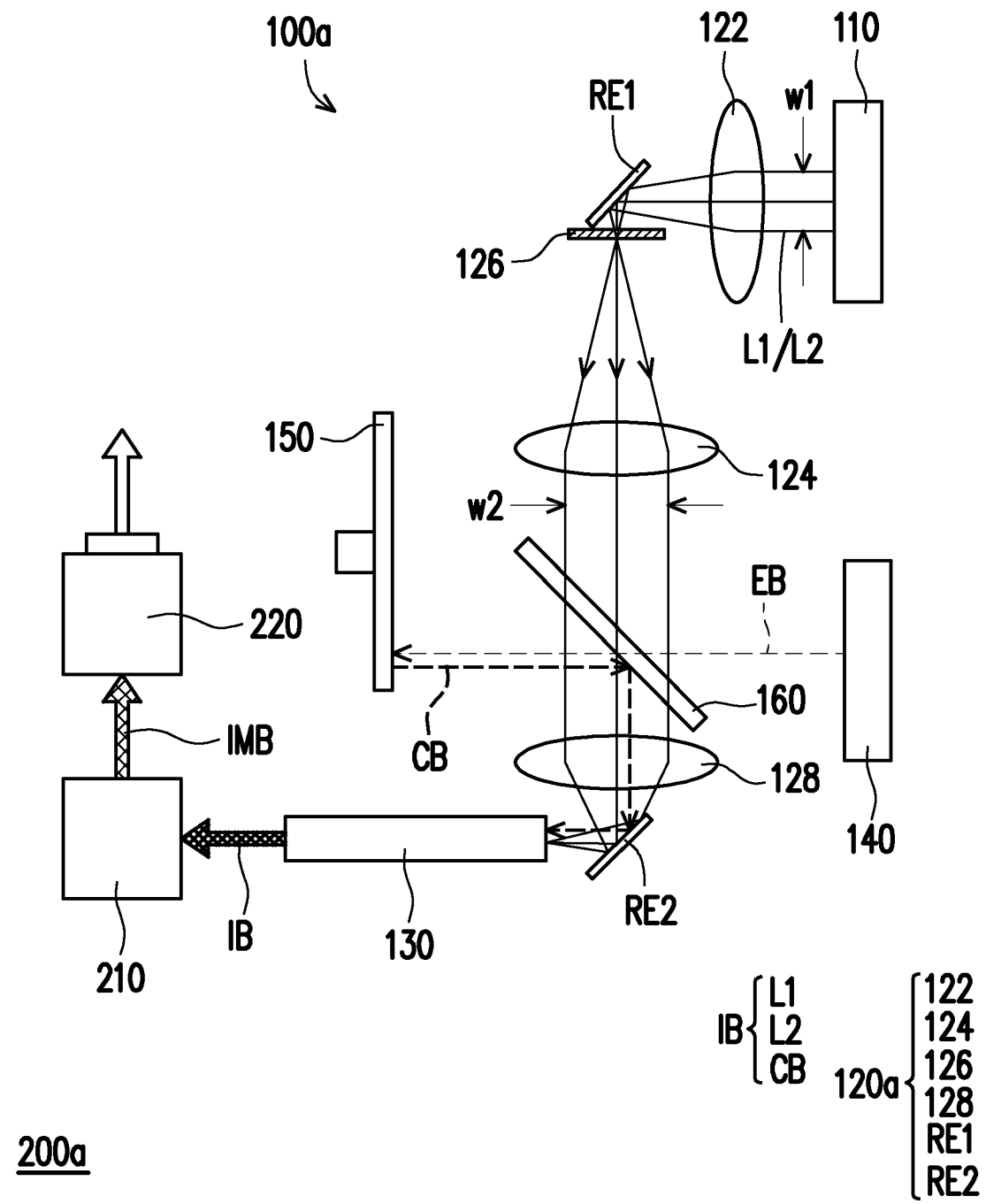
FIG. 3 is a schematic diagram of a projection device according to another embodiment of the invention.

FIG. 3 is a schematic diagram of a projection device according to another embodiment of the invention. Referring to FIG. 3, the projection device 200a of the present embodiment is similar to the projection device 200 of the embodiment of FIG. 1, and the main difference is that the lens module 120a of the illumination system 100a of the present embodiment further includes a first reflective element RE1 and a second reflective element RE2. The first reflective element RE1 is disposed between the first lens assembly 122 and the diffusion element 126, wherein the first reflective element RE1 is configured to change the propagation direction of the illumination beam IB (for example, the first beam L1 and the second beam L2). The second reflective element RE2 is disposed on the transmission path of the illumination beam IB from the second lens assembly 124, wherein the second reflective element RE2 is configured to change the propagation direction of the illumination beam IB.

In the embodiment shown in FIG. 3, the first reflective element RE1 of the present embodiment is disposed on the optical path between the first lens assembly 122 and the diffusion element 126, and the second reflective element RE2 of the present embodiment is disposed on the optical path between the third lens assembly 128 and the light uniformizing element 130. However, in other embodiments, the second reflective element RE2 may be disposed on the optical path between the second lens assembly 124 and the third lens assembly 128. Alternatively, in some other embodiments, the lens module 120a may not include the second reflective element RE2, and the third lens assembly 128 may directly focus the illumination beam IB to the light receiving end of the light uniformizing element 130 (in such a case, the light uniformizing element 130 is rotated by 90 degrees accordingly).

In some embodiments, the illumination beam IB travels a first optical path length (equivalent to the distance between the first lens assembly 122 and the first reflective element RE1 plus the distance between the first reflective element RE1 and the diffusion element 126) between the first lens assembly 122 and the diffusion element 126, and the first optical path length is substantially equal to the first equivalent focal length of the first lens assembly 122. The illumination beam IB travels a second optical path length between the diffusion element 126 and the second lens assembly 124, and the second optical path length is substantially equal to the second equivalent focal length of the second lens assembly 124. Similarly, the illumination beam IB travels a third optical path length (equivalent to the distance between the first lens assembly 122 and the first reflective element RE1 plus the distance between the first reflective element RE1 and the second lens assembly 124) between the first lens assembly 122 and the second lens assembly 124, and the third optical path length is substantially equal to the sum of the first equivalent focal length of the first lens assembly 122 and the second equivalent focal length of the second lens assembly 124.

In other embodiments, the lens module 120a may not include the diffusion element 126. In such a case, the second equivalent focal length of the second lens assembly 124 is greater than the first equivalent focal length of the first lens assembly 122, so that the first lens assembly 122 and the second lens assembly 124 also provide a beam expanding function.

In addition, the lens module 120a may not include the diffusion element 126, and in the case where the second equivalent focal length of the second lens assembly 124 is greater than the first equivalent focal length of the first lens assembly 122, the distance between the first lens assembly 122 and the first reflective element RE1 may be substantially equal to the first equivalent focal length. Alternatively, the distance between the first reflective element RE1 and the second lens assembly 124 may be substantially equal to the second equivalent focal length. Nevertheless, the disclosure is not intended to limit the position for disposing the first reflective element RE1.

In the embodiment shown in FIG. 3, since the first reflective element RE1 is disposed on the optical path before the second lens assembly 124 (that is, on the path before the beam is expanded) and the second reflective element RE2 is disposed on the optical path after the second lens assembly 124 (that is, on the path after the beam is expanded), the size of the first spot that the illumination beam IB forms on the first reflective element RE1 is smaller than the size of the second spot that the illumination beam IB forms on the second reflective element RE2. Nevertheless, the invention is not limited thereto. In other embodiments, for example, when the first reflective element RE1 is very close to the first lens assembly 122 and/or the second reflective element RE2 is very close to the light uniformizing element 130, the size of the first spot that the illumination beam IB forms on the first reflective element RE1 may be smaller than or equal to the size of the second spot that the illumination beam IB forms on the second reflective element RE2.

Figure 4:
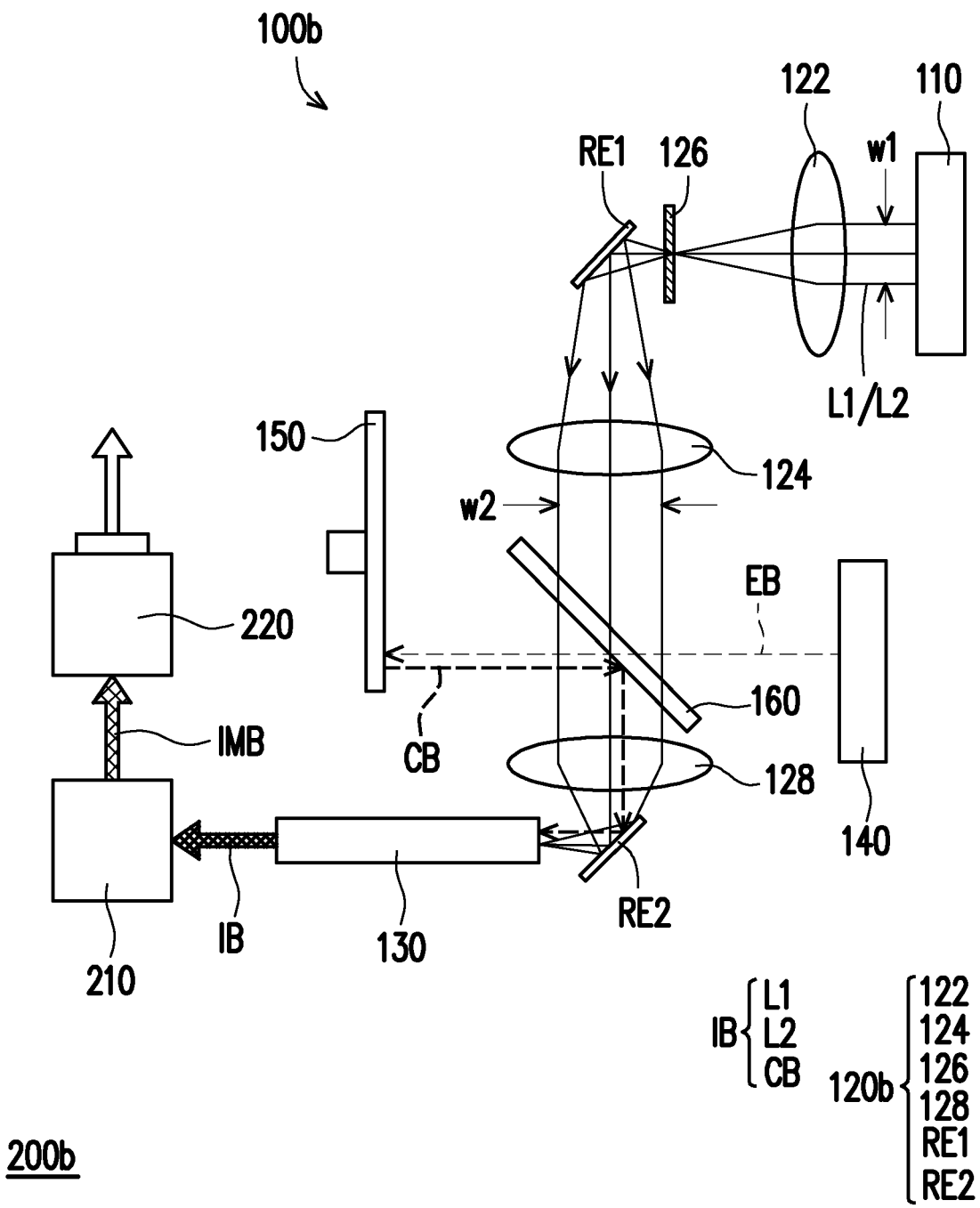
FIG. 4 is a schematic diagram of a projection device according to another embodiment of the invention.

FIG. 4 is a schematic diagram of a projection device according to another embodiment of the invention. Referring to FIG. 4, the projection device 200b of the present embodiment is similar to the projection device 200a of the embodiment of FIG. 3, and the main difference is that the first reflective element RE1 of the lens module 120b of the illumination system 100b of the present embodiment is disposed between the diffusion element 126 and the second lens assembly 124. That is to say, the first reflective element RE1 is disposed on the optical path between the diffusion element 126 and the second lens assembly 124.

In the present embodiment, the illumination beam IB travels a first optical path length between the first lens assembly 122 and the diffusion element 126, and the first optical path length is substantially equal to the first equivalent focal length of the first lens assembly 122. The illumination beam IB travels a second optical path length (equivalent to the distance between the diffusion element 126 and the first reflective element RE1 plus the distance between the first reflective element RE1 and the second lens assembly 124) between the diffusion element 126 and the second lens assembly 124, and the second optical path length is substantially equal to the second equivalent focal length of the second lens assembly 124. The illumination beam IB travels a third optical path length (equivalent to the distance between the first lens assembly 122 and the first reflective element RE1 plus the distance between the first reflective element RE1 and the second lens assembly 124) between the first lens assembly 122 and the second lens assembly 124, and the third optical path length is substantially equal to the sum of the first equivalent focal length of the first lens assembly 122 and the second equivalent focal length of the second lens assembly 124.

In conclusion, in the projection device of the embodiment of the invention, since the second equivalent focal length of the second lens assembly is greater than or equal to the first equivalent focal length of the first lens assembly, and the diffusion element can also expand the opening angle of the beam that passes through, the lens module can be used to expand the beam. Therefore, the beam that has passed through the lens module has a larger beam diameter, which increases the incident angle when the beam is focused to the light uniformizing element, and increases the number of times the beam is reflected in the light uniformizing element, thereby improving the uniformity of the light mixing. Thus, the projection device of the embodiment of the invention provides a projection image with uniform color distribution.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A lens module disposed on a transmission path of a beam and configured to expand the beam, the lens module comprising:
   a first lens assembly disposed on the transmission path of the beam, wherein the first lens assembly has a first equivalent focal length;
   a second lens assembly disposed on the transmission path of the beam from the first lens assembly, wherein the second lens assembly has a second equivalent focal length, and
   a diffusion element disposed on the transmission path of the beam from the first lens assembly, wherein the beam sequentially passes through the first lens assembly, the diffusion element, and the second lens assembly,
   wherein the second equivalent focal length is greater than or equal to the first equivalent focal length, wherein the beam travels a first optical path length between the first lens assembly and the diffusion element, and the first optical path length is equal to the first equivalent focal length.

2. The lens module according to claim 1, wherein the beam has a first width before passing through the lens module, and the beam has a second width after passing through the lens module, wherein the second width is greater than the first width.

3. The lens module according to claim 1, wherein the beam travels a second optical path length between the diffusion element and the second lens assembly, and the second optical path length is equal to the second equivalent focal length.

4. The lens module according to claim 1, wherein the first lens assembly is configured to focus the beam, and the second lens assembly is configured to collimate the beam.

5. The lens module according to claim 1, further comprising a first reflective element disposed between the first lens assembly and the diffusion element or between the diffusion element and the second lens assembly, wherein the first reflective element is configured to change a propagation direction of the beam.

6. The lens module according to claim 5, further comprising a second reflective element disposed on the transmission path of the beam from the second lens assembly, wherein the second reflective element is configured to change the propagation direction of the beam, and a size of a first spot that the beam forms on the first reflective element is smaller than a size of a second spot that the beam forms on the second reflective element.

7. The lens module according to claim 1, further comprising a third lens assembly disposed on the transmission path of the beam from the second lens assembly, wherein the third lens assembly is configured to focus the beam.

8. A lens module disposed on a transmission path of a beam and configured to expand the beam, the lens module comprising:
- a first lens assembly disposed on the transmission path of the beam, wherein the first lens assembly has a first equivalent focal length; and
- a second lens assembly disposed on the transmission path of the beam from the first lens assembly, wherein the second lens assembly has a second equivalent focal length,
- wherein the second equivalent focal length is greater than or equal to the first equivalent focal length,
- wherein the beam travels a third optical path length between the first lens assembly and the second lens assembly, and the third optical path length is equal to a sum of the first equivalent focal length and the second equivalent focal length.

9. A projection device, comprising:
- an illumination system configured to provide an illumination beam, wherein the illumination system comprises:
  - a light source module configured to emit the illumination beam;
  - a lens module disposed on a transmission path of the illumination beam and configured to expand the illumination beam, wherein the lens module comprises:
    - a first lens assembly disposed on the transmission path of the illumination beam and having a first equivalent focal length;
    - a second lens assembly disposed on the transmission path of the illumination beam from the first lens assembly and having a second equivalent focal length, wherein the second equivalent focal length is greater than or equal to the first equivalent focal length;
    - a diffusion element disposed on the transmission path of the illumination beam from the first lens assembly, wherein the illumination beam sequentially passes through the first lens assembly, the diffusion element, and the second lens assembly, wherein the illumination beam travels a first optical path length between the first lens assembly and the diffusion element, and the first optical path length is equal to the first equivalent focal length; and
  - a light uniformizing element disposed on the transmission path of the illumination beam from the lens module;
- a light valve disposed on the transmission path of the illumination beam to modulate the illumination beam into an image beam; and
- a projection lens disposed on a transmission path of the image beam.

10. The projection device according to claim 9, wherein the illumination beam has a first width before passing through the lens module, and the illumination beam has a second width after passing through the lens module, wherein the second width is greater than the first width.

11. The projection device according to claim 9, wherein the illumination beam travels a second optical path length between the diffusion element and the second lens assembly, and the second optical path length is equal to the second equivalent focal length.

12. The projection device according to claim 9, wherein the first lens assembly is configured to focus the illumination beam, and the second lens assembly is configured to collimate the illumination beam.

13. The projection device according to claim 9, wherein the lens module further comprises a first reflective element disposed between the first lens assembly and the diffusion element or between the diffusion element and the second lens assembly, and the first reflective element is configured to change a propagation direction of the illumination beam.

14. The projection device according to claim 13, wherein the lens module further comprises a second reflective element disposed on the transmission path of the illumination beam from the second lens assembly, and the second reflective element is configured to change the propagation direction of the illumination beam, wherein a size of a first spot that the illumination beam forms on the first reflective element is smaller than a size of a second spot that the illumination beam forms on the second reflective element.

15. The projection device according to claim 9, wherein the lens module further comprises a third lens assembly disposed on the transmission path of the illumination beam from the second lens assembly, and the third lens assembly is configured to focus the illumination beam.

16. The projection device according to claim 9, wherein the light source module comprises at least one first light source and at least one second light source, the at least one first light source is configured to emit at least one first beam, the at least one second light source is configured to emit at least one second beam, and the illumination beam comprises the at least one first beam and the at least one second beam, wherein a main wavelength of the at least one first beam differs from a main wavelength of the at least one second beam by 50 nm or more.

17. The projection device according to claim 9, wherein the illumination system further comprises:
- an excitation light source configured to emit an excitation beam; and
- a wavelength conversion element disposed on a transmission path of the excitation beam and configured to convert the excitation beam into a conversion beam.

18. A projection device, comprising:
- an illumination system configured to provide an illumination beam, wherein the illumination system comprises:
  - a light source module configured to emit the illumination beam;
  - a lens module disposed on a transmission path of the illumination beam and configured to expand the illumination beam, wherein the lens module comprises:
    - a first lens assembly disposed on the transmission path of the illumination beam and having a first equivalent focal length; and
    - a second lens assembly disposed on the transmission path of the illumination beam from the first lens assembly and having a second equivalent focal length, wherein the second equivalent focal length is greater than or equal to the first equivalent focal length, wherein the illumination beam travels a third optical path length between the first lens assembly and the second lens assembly, and the third optical path length is equal to a sum of the first equivalent focal length and the second equivalent focal length; and a light uniformizing element disposed on the transmission path of the illumination beam from the lens module:

a light valve disposed on the transmission path of the illumination beam to modulate the illumination beam into an image beam; and a projection lens disposed on a transmission path of the image beam.

* * * * *